United States Patent
Bourane et al.

(10) Patent No.: US 8,906,227 B2
(45) Date of Patent: Dec. 9, 2014

(54) MILD HYDRODESULFURIZATION INTEGRATING GAS PHASE CATALYTIC OXIDATION TO PRODUCE FUELS HAVING AN ULTRA-LOW LEVEL OF ORGANOSULFUR COMPOUNDS

(71) Applicants: Saudi Arabian Oil Company, Dhahran (SA); Boreskov Institute of Catalysis, Novosibirsk (RU)

(72) Inventors: Abdennour Bourane, Ras Tanura (SA); Omer Refa Koseoglu, Dhahran (SA); Zinfer Ismagilov, Novosibirsk (RU); Svetlana Yashnik, Novosibirsk (RU); Mikhail Kerzhentsev, Novosibirsk (RU); Valentin Parmon, Novosibirsk (RU)

(73) Assignees: Suadi Arabian Oil Company, Dhahran (SA); Boreskov Institute of Catalysis, Nuvosibirsk (RU)

( * ) Notice: Subject to any disclaimer, the term of this patent is extended or adjusted under 35 U.S.C. 154(b) by 122 days.

(21) Appl. No.: 13/741,819

(22) Filed: Jan. 15, 2013

(65) Prior Publication Data
US 2013/0199968 A1     Aug. 8, 2013

Related U.S. Application Data

(60) Provisional application No. 61/594,174, filed on Feb. 2, 2012.

(51) Int. Cl.
    *C10G 67/12*        (2006.01)
    (Continued)

(52) U.S. Cl.
    CPC .............. *C10G 67/12* (2013.01); *B01J 35/023* (2013.01); *B01J 23/80* (2013.01);
    (Continued)

(58) Field of Classification Search
    USPC .............................. 208/208 R, 246–247, 296
    See application file for complete search history.

(56) References Cited

U.S. PATENT DOCUMENTS 3,063,936 A    11/1952    Pearce et al.
2,640,010 A    5/1953     Hoover
(Continued)

FOREIGN PATENT DOCUMENTS

CA    1159435 A1    12/1983
EP    034338 A2    8/1981
(Continued)

OTHER PUBLICATIONS

International Search Report and the Written Opinion, PCT/US2013/023861, Jun. 4, 2013, 9 pages.
(Continued)

*Primary Examiner* — Brian McCaig
(74) *Attorney, Agent, or Firm* — Abelman, Frayne & Schwab

(57) ABSTRACT

Desulfurization of hydrocarbon feeds is achieved by first contacting the entire feed with a hydrodesulfurization catalyst in a hydrodesulfurization reaction zone operating under mild conditions; a flashing column downstream of the hydrodesulfurization reaction zone fractionates the effluent to obtain a first fraction which contains refractory organosulfur compounds and a second fraction that is substantially free of organosulfur compounds, since the organosulfur compounds boiling in the range of this fraction were the labile organosulfur compounds which were initially removed by mild hydrodesulfurization. The first fraction is contacted with a gaseous oxidizing agent over an oxidation catalyst having a formula $Cu_xZn_{1-x}Al_2O_4$ in a gas phase catalytic oxidation reaction zone to convert the refractory organosulfur compounds to $SO_x$ and low sulfur hydrocarbons. The by-product $SO_x$ is subsequently removed, producing a stream containing a reduced level of organosulfur compounds.

33 Claims, 3 Drawing Sheets

(51) Int. Cl.

| | | |
|---|---|---|
| *B01J 35/02* | (2006.01) | |
| *B01J 23/80* | (2006.01) | |
| *B01J 37/03* | (2006.01) | |
| *B01J 35/10* | (2006.01) | |
| *B01J 35/08* | (2006.01) | |
| *C10G 45/02* | (2006.01) | |
| *C10G 27/04* | (2006.01) | |
| *B01J 23/83* | (2006.01) | |
| *B01J 37/00* | (2006.01) | |
| *B01J 23/00* | (2006.01) | |
| *B01J 35/00* | (2006.01) | |

(52) U.S. Cl.
   CPC .............. *B01J 37/031* (2013.01); *B01J 23/005* (2013.01); *B01J 35/0006* (2013.01); *B01J 35/1038* (2013.01); *B01J 2523/00* (2013.01); *B01J 35/08* (2013.01); *C10G 45/02* (2013.01); *B01J 35/006* (2013.01); *B01J 35/1061* (2013.01); *B01J 35/026* (2013.01); *C10G 27/04* (2013.01); *B01J 23/83* (2013.01); *B01J 35/1014* (2013.01); *B01J 37/009* (2013.01); *B01J 23/002* (2013.01)
   USPC ......... 208/247; 208/208 R; 208/246; 208/296

(56) References Cited

U.S. PATENT DOCUMENTS

| | | | |
|---|---|---|---|
| 2,749,284 | A | 6/1956 | Noble |
| 2,771,401 | A | 11/1956 | Shepard |
| 3,193,495 | A | 7/1965 | Elior et al. |
| 3,341,448 | A | 9/1967 | Ford et al. |
| 3,551,328 | A | 12/1970 | Cole et al. |
| 3,565,793 | A | 2/1971 | Herbstman et al. |
| 3,719,589 | A | 3/1973 | Herbstman et al. |
| 3,767,563 | A | 10/1973 | Woodle |
| 3,785,965 | A | 1/1974 | Welty, Jr. |
| 3,816,301 | A | 6/1974 | Sorgenti |
| 3,847,800 | A | 11/1974 | Guth et al. |
| 3,945,914 | A | 3/1976 | Yoo et al. |
| 3,948,763 | A | 4/1976 | Christman et al. |
| 4,358,361 | A | 11/1982 | Peters |
| 4,359,450 | A | 11/1982 | Blytas et al. |
| 4,409,199 | A | 10/1983 | Blytas |
| 4,494,961 | A | 1/1985 | Venkat et al. |
| 4,557,821 | A | 12/1985 | Lopez et al. |
| 4,596,782 | A | 6/1986 | County et al. |
| 4,830,733 | A | 5/1989 | Nagji et al. |
| 4,976,848 | A | 12/1990 | Johnson |
| 5,232,854 | A | 8/1993 | Monticello |
| 5,290,427 | A | 3/1994 | Fletcher et al. |
| 5,387,523 | A | 2/1995 | Monticello |
| 5,730,860 | A | 3/1998 | Irvine |
| 5,753,102 | A | 5/1998 | Funakoshi et al. |
| 5,824,207 | A | 10/1998 | Lyapin et al. |
| 5,910,440 | A | 6/1999 | Grossman et al. |
| 5,914,029 | A | 6/1999 | Verachtert, II |
| 5,958,224 | A | 9/1999 | Ho et al. |
| 6,087,544 | A | 7/2000 | Wittenbrink et al. |
| 6,160,193 | A | 12/2000 | Gore |
| 6,171,478 | B1 | 1/2001 | Cabrera et al. |
| 6,193,877 | B1 * | 2/2001 | McVicker et al. ............. 208/217 |
| 6,217,748 | B1 | 4/2001 | Hatanaka et al. |
| 6,218,333 | B1 | 4/2001 | Gabrielov et al. |
| 6,228,254 | B1 | 5/2001 | Jossens et al. |
| 6,274,785 | B1 | 8/2001 | Gore |
| 6,277,271 | B1 | 8/2001 | Kocal |
| 6,368,495 | B1 | 4/2002 | Kocal et al. |
| 6,402,940 | B1 | 6/2002 | Rappas |
| 6,406,616 | B1 | 6/2002 | Rappas et al. |
| 6,441,264 | B1 | 8/2002 | Lemaire et al. |
| 6,461,859 | B1 | 10/2002 | Duhalt et al. |
| 6,495,029 | B1 | 12/2002 | Schorfheide et al. |
| 6,500,219 | B1 | 12/2002 | Gunnerman |
| 6,596,177 | B2 | 7/2003 | Sherman |
| 6,627,572 | B1 | 9/2003 | Cai et al. |
| 6,827,845 | B2 | 12/2004 | Gong et al. |
| 6,841,062 | B2 | 1/2005 | Reynolds |
| 6,843,906 | B1 | 1/2005 | Eng |
| 6,875,340 | B2 | 4/2005 | Lin et al. |
| 7,001,504 | B2 | 2/2006 | Schoonover |
| 7,122,114 | B2 | 10/2006 | Dean |
| 7,153,414 | B2 | 12/2006 | De Souza |
| 7,252,756 | B2 | 8/2007 | Gong et al. |
| 7,309,416 | B2 | 12/2007 | Fokema et al. |
| 7,314,545 | B2 | 1/2008 | Karas et al. |
| 7,347,930 | B2 | 3/2008 | Long et al. |
| 7,374,666 | B2 | 5/2008 | Wachs |
| 7,666,297 | B2 | 2/2010 | Lee et al. |
| 7,749,375 | B2 | 7/2010 | Kokayeff et al. |
| 8,002,970 | B2 | 8/2011 | Euzen et al. |
| 2002/0029997 | A1 | 3/2002 | Rappas et al. |
| 2002/0035306 | A1 | 3/2002 | Gore et al. |
| 2002/0144932 | A1 | 10/2002 | Gong et al. |
| 2002/0189975 | A1 | 12/2002 | De Souza |
| 2003/0019794 | A1 | 1/2003 | Schmidt et al. |
| 2003/0034275 | A1 | 2/2003 | Roberie et al. |
| 2003/0075483 | A1 | 4/2003 | Stanciulescu et al. |
| 2003/0085156 | A1 | 5/2003 | Schoonover |
| 2003/0094400 | A1 | 5/2003 | Levy et al. |
| 2004/0007501 | A1 | 1/2004 | Sughrue et al. |
| 2004/0007502 | A1 | 1/2004 | Wismann et al. |
| 2004/0108252 | A1 | 6/2004 | De Souza |
| 2004/0118750 | A1 | 6/2004 | Gong et al. |
| 2004/0154959 | A1 | 8/2004 | Schoebrechts et al. |
| 2004/0222131 | A1 | 11/2004 | Cullen |
| 2004/0222134 | A1 | 11/2004 | De Souza |
| 2005/0040078 | A1 | 2/2005 | Zilnnen et al. |
| 2005/0109678 | A1 | 5/2005 | Ketley et al. |
| 2005/0150819 | A1 | 7/2005 | Wachs |
| 2005/0218038 | A1 | 10/2005 | Nero et al. |
| 2006/0021913 | A1 | 2/2006 | Ketley et al. |
| 2006/0054535 | A1 | 3/2006 | Pak |
| 2006/0054537 | A1 | 3/2006 | Cholley et al. |
| 2006/0081501 | A1 | 4/2006 | Kozyuk |
| 2006/0108263 | A1 | 5/2006 | Lin |
| 2006/0131214 | A1 | 6/2006 | De Souza et al. |
| 2006/0144761 | A1 | 7/2006 | Keckler et al. |
| 2006/0154814 | A1 | 7/2006 | Zanibelli et al. |
| 2006/0180501 | A1 | 8/2006 | Da Silva et al. |
| 2007/0012184 | A1 | 1/2007 | Duraiswamy et al. |
| 2007/0051667 | A1 | 3/2007 | Martinie et al. |
| 2007/0102323 | A1 | 5/2007 | Lee et al. |
| 2007/0151901 | A1 | 7/2007 | Sain et al. |
| 2007/0227947 | A1 | 10/2007 | Reynolds |
| 2007/0227951 | A1 | 10/2007 | Thirugnanasampanthar et al. |
| 2008/0099375 | A1 | 5/2008 | Landau et al. |
| 2008/0116112 | A1 | 5/2008 | Umansky et al. |
| 2008/0149533 | A1 | 6/2008 | Yoo et al. |
| 2009/0065399 | A1 | 3/2009 | Kocal et al. |
| 2009/0118556 | A1 | 5/2009 | Euzen et al. |
| 2011/0220547 | A1 | 9/2011 | Bourane et al. |
| 2011/0220550 | A1 | 9/2011 | Bourane et al. |
| 2011/0233110 | A1 | 9/2011 | Koseoglu et al. |
| 2012/0145599 | A1 | 6/2012 | Koseoglu et al. |
| 2013/0026072 | A1* | 1/2013 | Bourane et al. ............... 208/247 |

FOREIGN PATENT DOCUMENTS

| | | |
|---|---|---|
| EP | 234745 A1 | 9/1987 |
| EP | 1077081 A2 | 2/2001 |
| EP | 2067527 A1 | 10/2007 |
| EP | 2135673 A1 | 12/2009 |
| GB | 773173 A | 4/1957 |
| JP | 2001151748 A | 6/2001 |
| JP | 2004195445 A | 7/2004 |
| JP | 2004196927 A | 7/2004 |
| WO | 0218518 A1 | 3/2002 |
| WO | 0226916 A1 | 4/2002 |
| WO | 02074884 A1 | 9/2002 |
| WO | 03004412 A1 | 1/2003 |
| WO | 03014266 A1 | 2/2003 |
| WO | 03035800 A2 | 10/2003 |

(56) References Cited

FOREIGN PATENT DOCUMENTS

| WO | 2004005435 A1 | 1/2004 |
|---|---|---|
| WO | 2005012458 A1 | 2/2005 |
| WO | 2005040308 A2 | 5/2005 |
| WO | 2005061675 A1 | 7/2005 |
| WO | 2006071793 A1 | 7/2006 |
| WO | 2007103440 A2 | 9/2007 |
| WO | 2007106943 A1 | 9/2007 |

OTHER PUBLICATIONS

International Search Report and the Written Opinion, PCT/US2013/023848, Jun. 4, 2013, 12 pages.
International Search Report and the Written Opinion, PCT/US2012/041508, Aug. 23, 2012, 15 pages.
Office Action, U.S. Appl. No. 13/191,939, Jul. 17, 2014, 8 pages.
Office Action, U.S. Appl. No. 13/491,815, Jul. 17, 2014, 13 pages.
Third Party Submission, U.S. Appl. No. 13/491,815, Jul. 17, 2014, 8 pages.
Cheng-Chung Chang et al., "Oxidative Steam Reforming of Methanol Over CuO/ZnO/CeO2/ZrO2/Al2O3 Catalysts," Int. J. Hydrogen Energy 35:7675-7683 (2010).
Omer R. Koseoglu et al., "Predicting Hydrotreating Catalyst Deactivation Rate," Saudi Aramco Journal of Technology, 66-71 (Summary, 2008).
Patel, et al., "Selective Production of Hydrogen Via Oxidative Steam Reforming of Methanol Using Cu—Zn—Ce—Al Oxide Catalysts," Chen. Engr. Sci 62:5436-5443 (2007).
Lida Gao, et al., "Hydrotalcite-like Compounds Derived CuZnAl Oxide Catalysts for Aerobic Oxidative Removal of Gasoline-Range Organosulfur Compounds" Energy As Fuels 23:624-630 (2009).
M.J.L. Ginés, et al., "Activity and Structure-Sensitivity of the Water-Gas Shift Reaction Over Cu—Zn—Al Mixed Oxcide Catalysts," App. Catalyses A: General 131:283-296 (1995).
A. Marafi et al., "Deep Desulfurization of Full Range and Low Boiling Diesel Streams From Kuwait Lower Fars Heavy Crude." Fuel Processing Technology, vol. 88, Issue 9, Sep. 2007, 905-911.
Antonio Chica et al., "Catalytic Oxidative Desulfurization (ODS) of Diesel Fuel on a Continuous Fixed-Bed Reactor." Journal of Catalysis, vol. 242, Issue 2, Sep. 10, 2006, 299-308.
Arturo J. Hernández-Maldonado et al., "Desulfurization of Commercial Fuels by π-Complexation: Monolayer CuCl/γ-Al2O3." Applied Catalysis B: Environmental, vol. 61, Issues 3-4, Nov. 9, 2005, 212-218.
Chang Hyun Ko et al., "Adsorptive Desulfurization of Diesel Using Metallic Nickel Supported on SBA-15 as Adsorbent." Studies in Surface Science and Catalysis, vol. 165, 2007, 881-884.
Chunshan Song et al., "New Design Approaches to Ultra-Clean Diesel Fuels by Deep Desulfurization and Deep Dearomatization." Applied Catalysis B: Environmental, vol. 41, Issues 1-2, Mar. 10, 2003, 207-238.
Chunshan Song, "An Overview of New Approaches to Deep Desulfurization for Ultra-Clean Gasoline, Diesel Fuel and Jet Fuel." Catalysis Today, vol. 86, Issues 1-4, Nov. 1, 2003, 211-263.
Esteban Pedernera et al., "'Deep Desulfurization of Middle Distillates: Process Adaptation to Oil Fractions' Compositions." Catalysis Today, vols. 79-80, Apr. 30, 2003, 371-381.
F. Villaseñor et al., "Oxidation of Dibenzothiophene by Laccase or Hydrogen Peroxide and Deep Desulfurization of Diesel Fuel by the Later." Fuel Processing Technology, vol. 86, Issue 1, Nov. 15, 2004, 49-59.
Farhan Al-Shahrani et al., "Desulfurization of Diesel Via the H2O2 Oxidation of Aromatic Sulfides to Sulfones Using a Tungstate Catalyst." Applied Catalysis B: Environmental, vol. 73, 3-4, May 11, 2007, 311-316.
Guoxian Yu et al., "Diesel Fuel Desulfurization With Hydrogen Peroxide Promoted by Formic Acid and Catalyzed by Activated Carbon." Carbon, vol. 43, Issue 11, Sep. 2005, 2285-2294.
Hai Mei et al., "A New Method for Obtaining Ultra-Low Sulfur Diesel Fuel Via Ultrasound Assisted Oxidative Desulfurization." Fuel, vol. 82, Issue 4, Mar. 2003, 405-414.
Hongying Lü et al., "Ultra-Deep Desulfurization of Diesel by Selective Oxidation With [C18H37N(CH3)3]4 [H2NPW10O36] Catalyst Assembled in Emulsion Droplets." Journal of Catalysis, vol. 239, Issue 2, Apr. 25, 2006, 369-375.
Isao Mochida et al., "Deep Hydrodesulfurization of Diesel Fuel: Design of Reaction Process and Catalysis." Catalysis Today, vol. 29, Issues 1-4, May 31, 1996, 185-189.
Jeyagowry T. Sampanthar et al., "A Novel Oxidative Desulfurization Process to Remove Refractory Sulfur-Compounds From Diesel Fuel." Applied Catalysis B: Environmental, vol. 63, Issues 1-2, Mar. 22, 2006, 85-93.
Jinbo Gao et al., "Deep Desulfurization From Fuel Oil Via Selective Oxidation Using an Amphiphilic Peroxotungsten Catalyst Assembled in Emulsion Droplets." Journal of Molecular Catalysis A: Chemical, vol. 258, Issues 102, Oct. 2, 2006, 261-266.
José Luis García-Gutiérrez et al., "Ultra-Deep Oxidative Desulfurization of Diesel Fuel by the Mo/Al2O3-H2O2 System: The Effect of System Parameters on Catalytic Activity." Applied Catalysis A, General, vol. 334, Issues 1-2, Jan. 1, 2008, 366-373.
José Luis García-Gutiérrez et al., "Ultra-Deep Oxidative Desulfurization of Diesel Fuel With H2O2 Catalyzed Under Mild Conditions by Polymolybdates Supported on Al2O3." Applied Catalysis A: General, vol. 305, Issue 1 May 17, 2006, 15-20.
Lawrence K. Wang et al., "Desulfurization and Emissions Control." Book Advanced Air and Noise Pollution Control, Handbook of Environmental Engineering, vol. 2, 2005, 35-95, Humana Press.
Luis Cedeño Caero et al., "Oxidative Desulfurization of Synthetic Diesel Using Supported Catalysts: Part 1. Study of The Operation Conditions With a Vanadium Oxide Based Catalyst." Catalysis Today, vols. 107-108, Oct. 30, 2005, 564-569.
Luis Cedeño Caero et al., "Oxidative Desulfurization of Synthetic Diesel Using Supported Catalysts: Part II Effect of Oxidant and Nitrogen-Compounds on Extraction-Oxidation Process." Catalysis Today, vol. 116, Issue 4, Sep. 15, 2006, 562-568.
Luis Cedeño-Caero et al., "Oxidative Desulfurization of Synthetic Diesel Using Supported Catalysts: Part III. Support Effect on Vanadium-Based Catalysts." Catalysis Today, 133-135, Apr.-Jun. 2008, 244-254.
M.V. Landau et al., "Tail-Selective Hydrocracking of Heavy Gas Oil in Diesel Production." Studies in Surface Science and Catalysis, vol. 106, 1997, 371-378.
Petr Steiner et al., "Catalytic hydrodesulfurization of a light gas oil over a NiMo catalyst: kinetics of selected sulfur components." Fuel Processing Technology, vol. 79, Issue 1, Aug. 2, 2002, 1-12.
Ruixiang Hua et al., "Determination of sulfur-containing compounds in diesel oils by comprehensive two-dimensional gas chromatography with a sulfur chemiluminescence detector." Journal of Chromatography, vol. 1019, Issues 1-2, Nov. 2003, 101-109.
Shujiro Otsuki et al., "Oxidative desulfurization of light gas oil and vacuum gas oil by oxidation and solvent extraction." Energy Fuels, 14, 2000, 1232-1239.
Shuzhi Liu et al., "Deep Desulfurization of Diesel Oil Oxidized by Fe (VI) Systems". Fuel, vol. 87, Issue 3, Mar. 2008, 422-428.
Sujit Mondal et al., "Oxidation of Sulfur Components in Diesel Fuel Using Fe-TAML® Catalysts and Hydrogen Peroxide." Catalysis Today, vol. 116, Issue 4, Sep. 15, 2006, 554-561.
Vinay M. Bhandari et al., "Desulfurization of Diesel Using Ion-Exchanges Zeolites." Chemical Engineering Science, vol. 61, Issue 8, Apr. 2006, 2599-2608.
Wei Dai et al., "Desulfurization of Transportation Fuels Targeting At Removal of Thiophene/Benzothiophene." Fuel Processing Technology. In Press, Corrected Proof. Web. Mar. 4, 2008, 749-755.
Xiaoliang Ma et al., "A New Approach to Deep Desulfurization of Gasoline, Diesel Fuel and Jet Fuel by Selective Adsorption for Ultra-Clean Fuels and for Fuel Cell Applications." Catalysis Today, 2002, 77, 1-2, 107-116.
Yosuke Sano et al., "Two-Step Adsorption Process for Deep Desulfurization of Diesel Oil." Fuel, vol. 84, Issues 7-8, May 2005, 903-910.
International Search Report and the Written Opinion, PCT/US11/46272, Dec. 19, 2011, pp. 1-8.

* cited by examiner

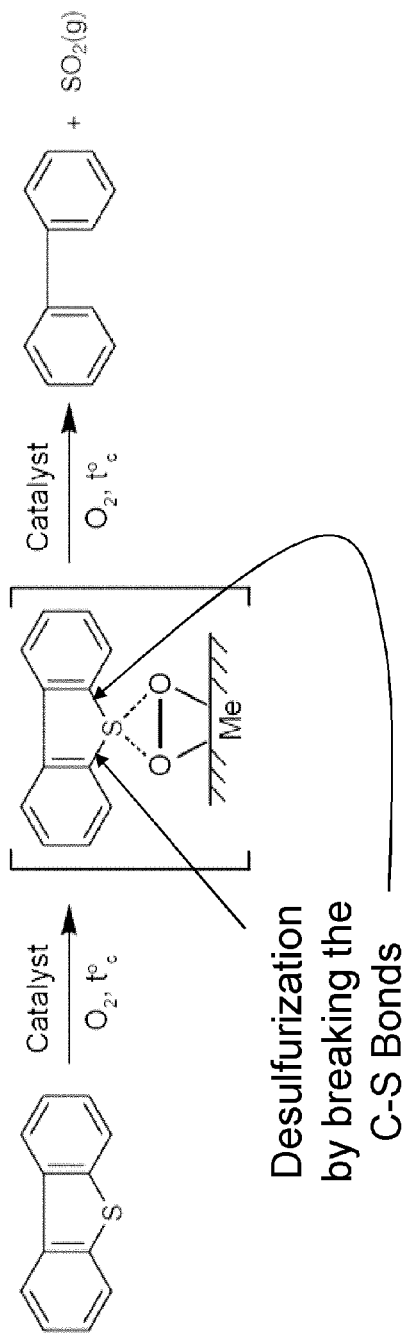
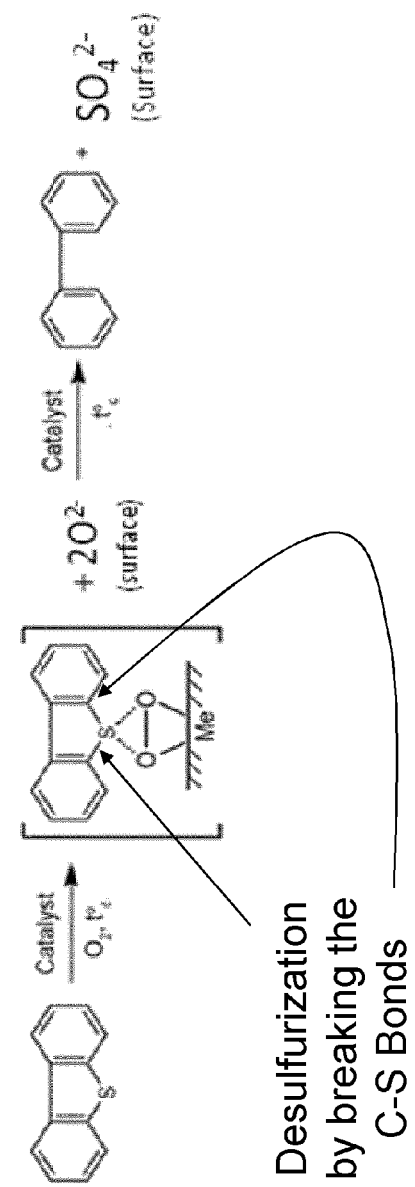
FIG. 3A
FIG. 3B

MILD HYDRODESULFURIZATION INTEGRATING GAS PHASE CATALYTIC OXIDATION TO PRODUCE FUELS HAVING AN ULTRA-LOW LEVEL OF ORGANOSULFUR COMPOUNDS

RELATED APPLICATIONS

This application claims priority to U.S. Provisional Patent Application Ser. No. 61/594,174 filed Feb. 2, 2012, which is incorporated by reference herein in its entirety.

BACKGROUND OF THE INVENTION

1. Field of the Invention

The present invention relates to integrated gas phase catalytic oxidative desulfurization processes to efficiently reduce the sulfur content of hydrocarbons.

2. Description of Related Art

The discharge into the atmosphere of sulfur compounds during processing and end-use of the petroleum products derived from sulfur-containing sour crude oil poses health and environmental problems. The stringent reduced-sulfur specifications applicable to transportation and other fuel products have impacted the refining industry, and it is necessary for refiners to make capital investments to greatly reduce the sulfur content in gas oils to 10 parts per million by weight (ppmw) or less. In the industrialized nations such as the United States, Japan and the countries of the European Union, refineries for transportation fuel have already been required to produce environmentally clean transportation fuels. For instance, in 2007 the United States Environmental Protection Agency required the sulfur content of highway diesel fuel to be reduced 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the footsteps of the United States and the European Union and are moving forward with regulations that will require refineries to produce transportation fuels with an ultra-low sulfur level.

To keep pace with recent trends toward production of ultra-low sulfur fuels, refiners must choose among the processes or crude oils that provide flexibility that ensures future specifications are met with minimum additional capital investment, in many instances by utilizing existing equipment. Technologies such as hydrocracking and two-stage hydrotreating offer solutions to refiners for the production of clean transportation fuels. These technologies are available and can be applied as new grassroots production facilities are constructed.

There are many hydrotreating units installed worldwide producing transportation fuels containing 500-3000 ppmw sulfur. These units were designed for, and are being operated at, relatively milder conditions (i.e., low hydrogen partial pressures of 30 kilograms per square centimeter for straight run gas oils boiling in the range of 180° C.-370° C.). Retrofitting is typically required to upgrade these existing facilities to meet the more stringent environmental sulfur specifications in transportation fuels mentioned above. However, because of the comparatively more severe operational requirements (i.e., higher temperature and pressure) to obtain clean fuel production, retrofitting can be substantial. Retrofitting can include one or more of integration of new reactors, incorporation of gas purification systems to increase the hydrogen partial pressure, reengineering the internal configuration and components of reactors, utilization of more active catalyst compositions, installation of improved reactor components to enhance liquid-solid contact, the increase of reactor volume, and the increase of the feedstock quality.

Sulfur-containing compounds that are typically present in hydrocarbon fuels include aliphatic molecules such as sulfides, disulfides and mercaptans as well as aromatic molecules such as thiophene, benzothiophene and its long chain alkylated derivatives, and dibenzothiophene and its alkyl derivatives such as 4,6-dimethyldibenzothiophene. Aromatic sulfur-containing molecules have a higher boiling point than aliphatic sulfur-containing molecules, and are consequently more abundant in higher boiling fractions.

In addition, certain fractions of gas oils possess different properties. The following table illustrates the properties of light and heavy gas oils derived from Arabian Light crude oil:

TABLE 1

|  |  | Light | Heavy |
|---|---|---|---|
| Feedstock Name |  |  |  |
| Blending Ratio |  | — | — |
| API Gravity | ° | 37.5 | 30.5 |
| Carbon | W % | 85.99 | 85.89 |
| Hydrogen | W % | 13.07 | 12.62 |
| Sulfur | W % | 0.95 | 1.65 |
| Nitrogen | ppmw | 42 | 225 |
| ASTM D86 Distillation |  |  |  |
| IBP/5 V % | ° C. | 189/228 | 147/244 |
| 10/30 V % | ° C. | 232/258 | 276/321 |
| 50/70 V % | ° C. | 276/296 | 349/373 |
| 85/90 V % | ° C. | 319/330 | 392/398 |
| 95 V % | ° C. | 347 |  |
| Sulfur Speciation |  |  |  |
| Organosulfur Compounds Boiling Less than 310° C. | ppmw | 4591 | 3923 |
| Dibenzothiophenes | ppmw | 1041 | 2256 |
| $C_1$-Dibenzothiophenes | ppmw | 1441 | 2239 |
| $C_2$-Dibenzothiophenes | ppmw | 1325 | 2712 |
| $C_3$-Dibenzothiophenes | ppmw | 1104 | 5370 |

As set forth above in Table 1, the light and heavy gas oil fractions have ASTM (American Society for Testing and Materials) D86 85V % point of 319° C. and 392° C., respectively. Further, the light gas oil fraction contains less sulfur and nitrogen than the heavy gas oil fraction (0.95 W % sulfur as compared to 1.65 W % sulfur and 42 ppmw nitrogen as compared to 225 ppmw nitrogen).

It is known that middle distillate cut boiling in the range of 170° C.-400° C. contains sulfur species including thiols, sulfides, disulfides, thiophenes, benzothiophenes, dibenzothiophenes, and benzonaphthothiophenes, with and without alkyl substituents. (Hua, et al., "Determination of Sulfur-containing Compounds in Diesel Oils by Comprehensive Two-Dimensional Gas Chromatography with a Sulfur Chemiluminescence Detector," *Journal of Chromatography A*, 1019 (2003) pp. 101-109).

The sulfur specification and content of light and heavy gas oils are conventionally analyzed by two methods. In the first method, sulfur species are categorized based on structural groups. The structural groups include one group having sulfur-containing compounds boiling at less than 310° C., including dibenzothiophenes and its alkylated isomers, and another group including 1, 2 and 3 methyl-substituted dibenzothiophenes, denoted as $C_1$, $C_2$ and $C_3$, respectively. Based on this method, the heavy gas oil fraction contains more alkylated di-benzothiophene molecules than the light gas oils.

In the second method of analyzing sulfur content of light and heavy gas oils, and referring to FIG. 1, the cumulative sulfur concentrations are plotted against the boiling points of the sulfur-containing compounds to observe concentration variations and trends. Note that the boiling points depicted are those of detected sulfur-containing compounds, rather than the boiling point of the total hydrocarbon mixture. The boiling point of the key sulfur-containing compounds consisting of dibenzothiophenes, 4-methyldibenzothiophenes and 4,6-dimethyldibenzothiophenesare also shown in FIG. 1 for convenience. The cumulative sulfur specification curves show that the heavy gas oil fraction contains a higher content of heavier sulfur-containing compounds and lower content of lighter sulfur-containing compounds as compared to the light gas oil fraction. For example, it is found that 5370 ppmw of $C_3$-dibenzothiophene, and bulkier molecules such as benzonaphthothiophenes, are present in the heavy gas oil fraction, compared to 1104 ppmw in the light gas oil fraction. In contrast, the light gas oil fraction contains a higher content of light sulfur-containing compounds compared to heavy gas oil. Light sulfur-containing compounds are structurally less bulky than dibenzothiophenes and boil at less than 310° C. Also, twice as much $C_1$ and $C_2$ alkyl-substituted dibenzothiophenes exist in the heavy gas oil fraction as compared to the light gas oil fraction.

Aliphatic sulfur-containing compounds are more easily desulfurized (labile) using conventional hydrodesulfurization methods. However, certain highly branched aliphatic molecules can hinder the sulfur atom removal and are moderately more difficult to desulfurize (refractory) using conventional hydrodesulfurization methods.

Among the sulfur-containing aromatic compounds, thiophenes and benzothiophenes are relatively easy to hydrodesulfurize. The addition of alkyl groups to the ring compounds increases the difficulty of hydrodesulfurization. Dibenzothiophenes resulting from addition of another ring to the benzothiophene family are even more difficult to desulfurize, and the difficulty varies greatly according to their alkyl substitution, with di-beta substitution being the most difficult to desulfurize, thus justifying their "refractory" appellation. These beta substituents hinder exposure of the heteroatom to the active site on the catalyst.

The economical removal of refractory sulfur-containing compounds is therefore exceedingly difficult to achieve, and accordingly removal of sulfur-containing compounds in hydrocarbon fuels to an ultra-low sulfur level is very costly by current hydrotreating techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

Relative reactivities of sulfur-containing compounds based on their first order reaction rates at 250° C. and 300° C. and 40.7 Kg/cm² hydrogen partial pressure over Ni—Mo/alumina catalyst, and activation energies, are given in Table 2 (Steiner P. and Blekkan E. A., "Catalytic Hydrodesulfurization of a Light Gas Oil over a NiMo Catalyst: Kinetics of Selected Sulfur Components," *Fuel Processing Technology*, 79 (2002) pp. 1-12).

TABLE 2

| Name | Dibenzothiophene | 4-methyl-dibenzo-thiophene | 4,6-dimethyl-dibenzo-thiophene |
|---|---|---|---|
| Structure | | | |
| Reactivity $k_{@250}$, s$^{-1}$ | 57.7 | 10.4 | 1.0 |
| Reactivity $k_{@300}$, s$^{-1}$ | 7.3 | 2.5 | 1.0 |
| Activation Energy $E_a$, Kcal/mol | 28.7 | 36.1 | 53.0 |

As is apparent from Table 2, dibenzothiophene is 57 times more reactive than the refractory 4,6-dimethyldibenzothiphene at 250° C. The relative reactivity decreases with increasing operating severity. With a 50° C. temperature increase, the relative reactivity of di-benzothiophene compared to 4,6-dibenzothiophene decreases to 7.3 from 57.7.

The development of non-catalytic processes for desulfurization of petroleum distillate feedstocks has been widely studied, and certain conventional approaches are based on oxidation of sulfur-containing compounds are described, e.g., in U.S. Pat. Nos. 5,910,440; 5,824,207; 5,753,102; 3,341,448 and 2,749,284.

Oxidative desulfurization (ODS) as applied to middle distillates is attractive for several reasons. First, mild reaction conditions, e.g., temperature from room temperature up to 200° C. and pressure from 1 up to 15 atmospheres, are normally used, thereby resulting a priori in reasonable investment and operational costs, especially for hydrogen consumption which is usually expensive. Another attractive aspect is related to the reactivity of high aromatic sulfur-containing species. This is evident since the high electron density at the sulfur atom caused by the attached electron-rich aromatic rings, which is further increased with the presence of additional alkyl groups on the aromatic rings, will favor its electrophilic attack as shown in Table 3 (Otsuki, et al., "Oxidative Desulfurization of Light Gas Oil and Vacuum Gas Oil by Oxidation and Solvent Extraction," *Energy &Fuels*, 14 (2000) pp. 1232-1239). However, the intrinsic reactivity of molecules such as 4,6-DMDBT should be substantially higher than that of dibenzothiophene (DBT), which is much easier to desulfurize by hydrodesulfurization.

TABLE 3

Electron Density of selected sulfur species

| Sulfur compound | Formulas | Electron Density | K (L/(mol. min)) |
|---|---|---|---|
| Thiophenol | | 5.902 | 0.270 |
| Methyl Phenyl Sulfide | | 5.915 | 0.295 |
| Diphenyl Sulfide | | 5.860 | 0.156 |
| 4,6-DMDBT | | 5.760 | 0.0767 |
| 4-MDBT | | 5.759 | 0.0627 |
| Dibenzothiophene | | 5.758 | 0.0460 |
| Benzothiophene | | 5.739 | 0.00574 |
| 2,5-Dimethylthiophene | | 5.716 | — |
| 2-methylthiophene | | 5.706 | — |
| Thiophene | | 5.696 | — |

Recently, the use of cobalt and manganese based catalysts in air based oxidation of DBT type aromatic sulfur compounds into polar sulfones and/or sulfoxides has been described. A wide number of transition metal oxides, including $MnO_2$, $Cr_2O_3$, $V_2O_5$, NiO, $MoO_3$ and $Co_3O_4$, or as well transition metal containing compounds such as chromates, vanadates, manganates, rhenates, molybdates and niobates are described, but the more active and selective compounds were manganese and cobalt oxides. It was shown that the manganese or cobalt oxides containing catalysts provided 80% oxidation conversion of DBT at 120° C. One advantage of these catalysts is that the treatment of fuel takes place in the liquid phase. The general reaction scheme for the ODS process suggested is as follows: sulfur compound R—S—R' is oxidized to sulfone R—$SO_2$—R', and the latter can decompose with heating, to liberate $SO_2$ and R—R', while leaving behind a useful hydrocarbon compounds that can be utilized. A recommended temperature is from 90° C. to 250° C. See, PCT Application No. WO2005/116169.

High catalytic activity of manganese and cobalt oxides supported on $Al_2O_3$ in oxidation of sulfur compounds at 130° C.-200° C. and atmospheric pressure has been described by Sampanthar, et al., "A Novel Oxidative Desulfurization Process to Remove Refractory Sulfur Compounds from Diesel Fuel," *Applied Catalysis B: Environmental,* 63(1-2), 2006, pp. 85-93. The authors show that, after the subsequent extraction of the oxidation products with a polar solvent, the sulfur content in the fuel decreased to 40-60 ppmw. The thiophenes conversion increased with time and it reached its maximum conversion of 80-90% in 8 hours. It was shown that the tri-substituted dibenzothiophene compounds were easier to be oxidized than the mono-substituted dibenzothiophenes. The oxidative reactivity of S-compounds in diesel follows the order: tri-alkyl-substituted dibenzothiophene>di-alkyl-substituted dibenzothiophene>mono-alkyl-substituted dibenzothiophene>dibenzothiophene. These results showed that the most refractory sulfur compounds in the diesel hydrodesulfurization were more reactive in the oxidative desulfurization of fuel.

U.S. Pat. No. 5,969,191 describes a catalytic thermochemical process. A key catalytic reaction step in the thermochemical process scheme is the selective catalytic oxidation of organosulfur compounds (e.g., mercaptan) to a valuable chemical intermediate (e.g., $CH_3SH+2O_2 \rightarrow H_2CO+SO_2+H_2O$) over certain supported (mono-layered) metal oxide catalysts. The preferred catalyst employed in this process consists of a specially engineered $V_2O_5/TiO_2$ catalyst that minimizes the adverse effects of heat and mass transfer limitations that can result in the over oxidation of the desired $H_2CO$ to $CO_x$ and $H_2O$.

The process described later by the inventors in PCT Application No. WO 2003/051798 involves contacting of heterocyclic sulfur compounds in a hydrocarbon stream, e.g., in a petroleum feedstock or petroleum product, in the gas phase in the presence of oxygen with a supported metal oxide catalyst, or with a bulk metal oxide catalyst to convert at least a portion of the heterocyclic sulfur compounds to sulfur dioxide and to useful oxygenated products as well as sulfur-deficient hydrocarbons and separately recovering the oxygenated products separately from a hydrocarbon stream with substantially reduced sulfur. The catalytic metal oxide layer supported by the metal oxide support is based on a metal selected from the group consisting of Ti, Zr, Mo, Re, V, Cr, W, Mn, Nb, Ta, and mixtures thereof. Generally, a support of titania, zirconia, ceria, niobia, tin oxide or a mixture of two or more of these is preferred. Bulk metal oxide catalysts based on molybdenum, chromium and vanadium can be also used. Sulfur content in fuel could be less than about 30-100 ppmw. The optimum space velocity likely will be maintained below 4800 V/V/hr and temperature will be 50° C.-200° C.

The vapor-phase oxidative desulfurization of various sulfur compounds (such as: COS, or $CS_2$, $CH_3SH$, $CH_3SCH_3$, $CH_3SSCH_3$, thiophene and 2,5-dimethylthiophene) by use of sulfur-tolerant $V_2O_5$-containing catalysts on different supports has been taught by Choi, S., et al., "Selective Oxidesulfurization of $C_1$-Organosulfur Compounds over Supported Metal Oxide Catalysts," Preprints of Symposia—American Chemical Society, Division of Fuel Chemistry, 47(1):138-139 (2002) and Choi S., et al., "Vapor-phase Oxidesulfurization (ODS) of Organosulfur Compounds: Carbonyl Sulfide, Methyl Mercaptans and Thiophene," Preprints of Symposia—American Chemical Society, Division of Fuel Chemistry, 49(2):514-515 (2004). In these papers, the feed gas contained 1000 ppmw of COS, or $CS_2$, $CH_3SH$, $CH_3SCH_3$, $CH_3SSCH_3$, thiophene and 2,5-dimethylthiophene, 18% $O_2$ in He balance. The formed products (formalin, CO, $H_2$, maleic anhydride and $SO_2$) were monitored by temperature programmed surface reaction mass spectrometry. It was shown that the turnover frequency for COS and $CS_2$ oxidation varied by about one order of magnitude depending on the support, in the order $CeO_2 > ZrO_2 > TiO_2 > Nb_2O_5 > Al_2O_3 — SiO_2$.

A common catalyst for oxidative desulfurization is activated carbon (Yu, et al., "Oxidative Desulfurization of Diesel Fuels with Hydrogen Peroxide in the Presence of Activated Carbon and Formic Acid," *Energy & Fuels*, 19(2) pp. 447-452 (2005); Wu, et al., "Desulfurization of gaseous fuels using activated carbons as catalysts for the selective oxidation of hydrogen sulfide," *Energy and Fuels*, 19(5) pp. 1774-1782 (2005)). The application of this method allows removal of hydrogen sulfide from gaseous fuels at 150° C. by oxidation with air (Wu, 2005) and also sulfur removal from diesel fuels using hydrogen peroxide (Yu, 2005). The higher adsorption capacity of the carbon, the higher its activity in the oxidation of dibenzothiophene.

Various catalytic desulfurization processes are known, for instance, U.S. Pat. Nos. 7,749,376, 4,596,782, 3,945,914, and 2,640,010.

Nonetheless, demand remains for additional efficient and effective process and apparatus for desulfurization of hydrocarbon fuels to an ultra-low sulfur level.

SUMMARY OF THE INVENTION

The above objects and further advantages are provided by the apparatus and process for desulfurization of hydrocarbon feeds containing both refractory and labile organosulfur compounds by mild hydrodesulfurization of a fuel stream to remove labile organosulfur compounds and gas phase oxidative desulfurization of a targeted fraction to remove refractory organosulfur compounds.

None of the above-mentioned references describe a suitable and cost-effective process for desulfurization of hydrocarbon fuel fractions with specific sub-processes and apparatus for targeting different organosulfur compounds. In particular, conventional methods do not fractionate a hydrocarbon fuel stream into fractions containing different classes of sulfur-containing compounds with different reactivities relative to the conditions of hydrodesulfurization and oxidative desulfurization. Conventionally, most approaches subject the entire gas oil stream to the oxidation reactions, requiring unit operations that must be appropriately dimensioned to accommodate the full process flow.

In addition, none of these references teach or suggest the use of a catalytic composition described herein for the effective removal of sulfur containing compounds from gaseous phase hydrocarbons in an oxidative process.

Accordingly, new grassroots integrated systems or retrofitted systems are provided herein capable of desulfurizing hydrocarbon fuel streams containing different classes of sulfur-containing compounds having different reactivities to produce hydrocarbon fuels with an ultra-low sulfur level. The goal is achieved by integrating mild hydrodesulfurization and gas phase oxidative desulfurization of refractory organosulfur compounds, and utilizing reactions separately directed to labile and refractory classes of sulfur-containing compounds. These systems provide this capability by utilizing reactions separately directed to labile and refractory classes of sulfur-containing compounds. These new or retrofitted systems integrate mild hydrodesulfurization and gas phase oxidative desulfurization of refractory organosulfur compounds.

As used herein in relation to the apparatus and process of the present invention, the term "labile organosulfur compounds" means organosulfur compounds that can be easily desulfurized under relatively mild hydrodesulfurization pressure and temperature conditions, and the term "refractory organosulfur compounds" means organosulfur compounds that are relatively more difficult to desulfurize under mild hydrodesulfurization conditions.

Additionally, as used herein in relation to the apparatus and process of the present invention, the terms "mild hydrodesulfurization" and "mild operating conditions" when used in reference to hydrodesulfurization of a mid-distillate stream, i.e., boiling in the range of about 180° C. to about 370° C., generally means hydrodesulfurization processes operating at: a temperature of about 300° C. to about 400° C., preferably about 320° C. to about 380° C.; a reaction pressure of about 20 bars to about 100 bars, preferably about 30 bars to about 60 bars; a hydrogen partial pressure of below about 55 bars, preferably about 25 bars to about 40 bars; a feed rate of about $0.5 \, hr^{-1}$ to about $10 \, hr^{-1}$, preferably about $1.0 \, hr^{-1}$ to about $4 \, hr^{-1}$; and a hydrogen feed rate of about 100 liters of hydrogen per liter of oil (L/L) to about 1000 L/L, preferably about 200 L/L to about 300 L/L.

The cost of hydrotreating is minimized by operating under relatively mild temperature and pressure conditions. Deep desulfurization of hydrocarbon fuels according to the present invention effectively optimizes use of integrated apparatus and processes, combining mild hydrodesulfurization and gas phase catalytic oxidative desulfurization. Refiners can readily adapt existing hydrodesulfurization equipment and run such equipment under mild operating conditions. Accordingly hydrocarbon fuels are economically desulfurized to an ultra-low level.

Deep desulfurization of hydrocarbon feed streams is achieved by first contacting the entire fuel stream with a hydrodesulfurization catalyst in a hydrodesulfurization reaction zone operating at mild conditions to remove labile organosulfur compounds. A flashing column downstream of the hydrodesulfurization reaction zone fractionates the hydrotreated effluent at a target cut point temperature to obtain two hydrocarbon fuel fractions. The organosulfur compounds in the first fraction, boiling at or above the target cut point temperature contains the remaining refractory organosulfur compounds, including 4,6-dimethyldibenzothiophene and its derivatives. A second fraction boiling below the target cut point temperature is substantially free of organosulfur compounds, since the organosulfur compounds boiling in the range of this fraction were the labile organosulfur compounds which were removed in the mild hydrodesulfurization step. The first fraction is contacted with a gaseous oxidizing agent over oxidation catalyst in a gas phase catalytic oxidation reaction zone to convert the refractory organosulfur compounds into hydrocarbons and $SO_x$. The by-product $SO_x$ is removed from the liquid by a separation system including gas liquid separators and/or strippers and/or distillation columns and/or membranes. The process produces a hydrocarbon product stream that contains an ultra-low level of organosulfur compounds.

The inclusion of a flashing column in an integrated system and process combining hydrodesulfurization and gas phase catalytic oxidative desulfurization allows a partition of the different classes of sulfur-containing compounds according to their respective reactivity factors, thereby optimizing utilization of the different types of desulfurization processes and hence resulting in a more cost effective process. The volumetric/mass flow through the gas phase catalytic oxidation reaction zone is reduced, since only the fraction of the original feedstream containing refractory sulfur-containing compounds is subjected to the gas phase catalytic oxidation process. As a result, the requisite equipment capacity, and accordingly both the capital equipment cost and the operating costs, are minimized. In addition, the total hydrocarbon stream is not subjected to gas phase catalytic oxidation reactions, thus avoiding unnecessary oxidation of organosulfur compounds that are otherwise desulfurized using mild hydrodesulfurization.

Furthermore, product quality is improved by the integrated process of the present invention since undesired side reactions associated with oxidation of the entire feedstream under generally harsh conditions are avoided.

BRIEF DESCRIPTION OF THE DRAWINGS

The foregoing summary, as well as the following detailed description of preferred embodiments of the invention will be best understood when read in conjunction with the attached drawings. For the purpose of illustrating the invention, there are shown in the drawings embodiments which are presently preferred. It should be understood, however, that the invention is not limited to the precise arrangements and apparatus shown.

FIGS. 3A and 3B are postulated gas phase catalytic oxidative desulfurization reaction mechanisms.

DETAILED DESCRIPTION OF THE INVENTION

An integrated desulfurization process is provided to produce hydrocarbon fuels with ultra-low levels of organosulfur compounds. The process includes the following steps:

a. Contacting the hydrocarbon stream in its entirety with a hydrotreating catalyst in a hydrodesulfurization reaction zone under mild operating conditions.

b. Flashing the effluent hydrotreated stream at a target cut point temperature of about 320° C. to about 360° C., in certain embodiments about 340° C., to obtain two fractions.

c. The fraction boiling below the target cut point temperature is substantially free of organosulfur compounds since the labile organosulfur compounds were converted during the hydrodesulfurization step.

d. The organosulfur compounds in the fraction boiling at or above the target cut point temperature are primarily refractory organosulfur compounds, including aromatic molecules such as certain benzothiophenes e.g., long chain alkylated benzothiophenes), dibenzothiophene and alkyl derivatives, e.g., 4,6-dimethyldibenzothiophene. This fraction is contacted with a gaseous oxidant over oxidation catalyst in a gas phase catalytic oxidation reaction zone to convert the organosulfur compounds into sulfur-free hydrocarbons and $SO_x$.

e. The by-product $SO_x$ is subsequently removed in a separation zone from the liquid products by apparatus that include gas-liquid separators and/or strippers and/or distillation columns and/or membranes.

f. The flashing column effluent fraction boiling below the target cut point temperature and the stream from the separation zone can be recombined to produce an ultra-low sulfur level hydrocarbon product, e.g., a full-range diesel fuel product.

Figure 1:
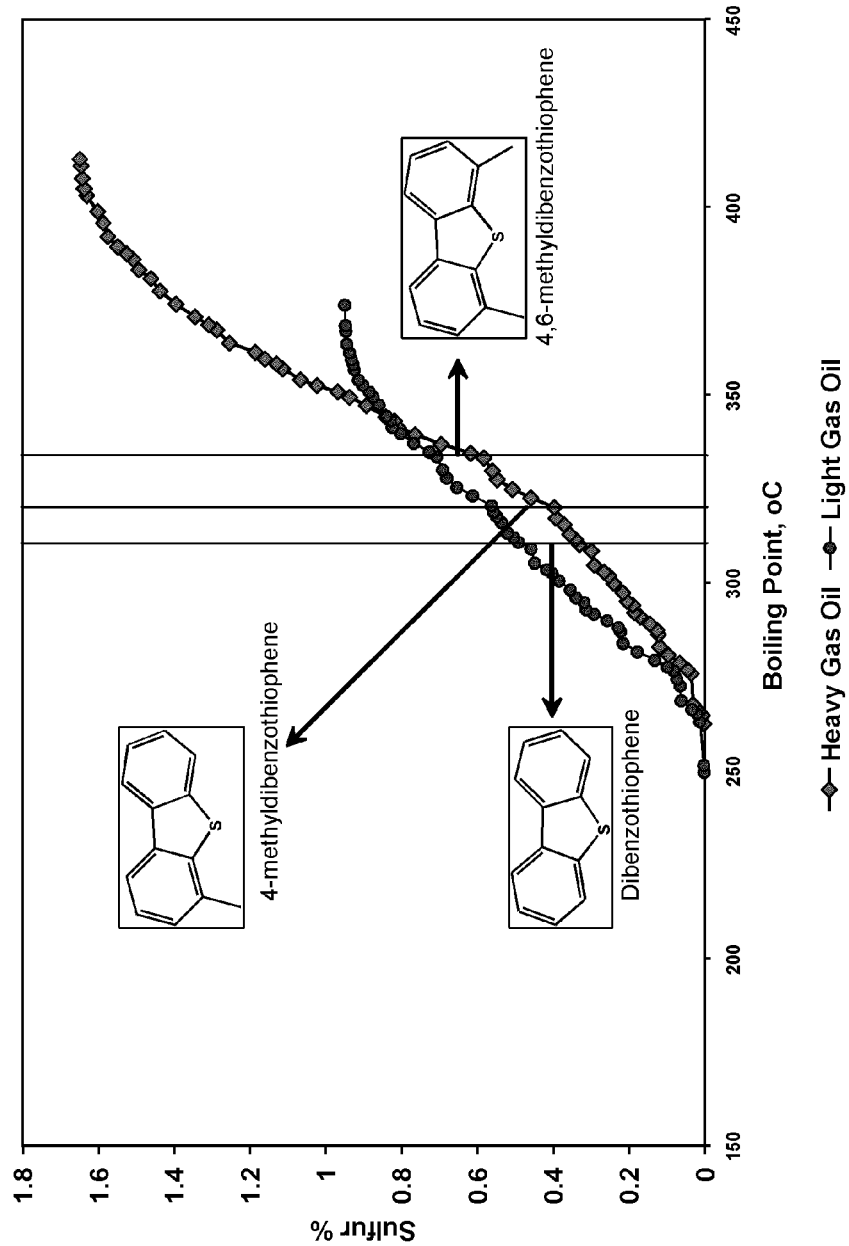
FIG. 1 is a graph showing cumulative sulfur concentrations plotted against boiling points of three thiophenic compounds.
Figure 2:
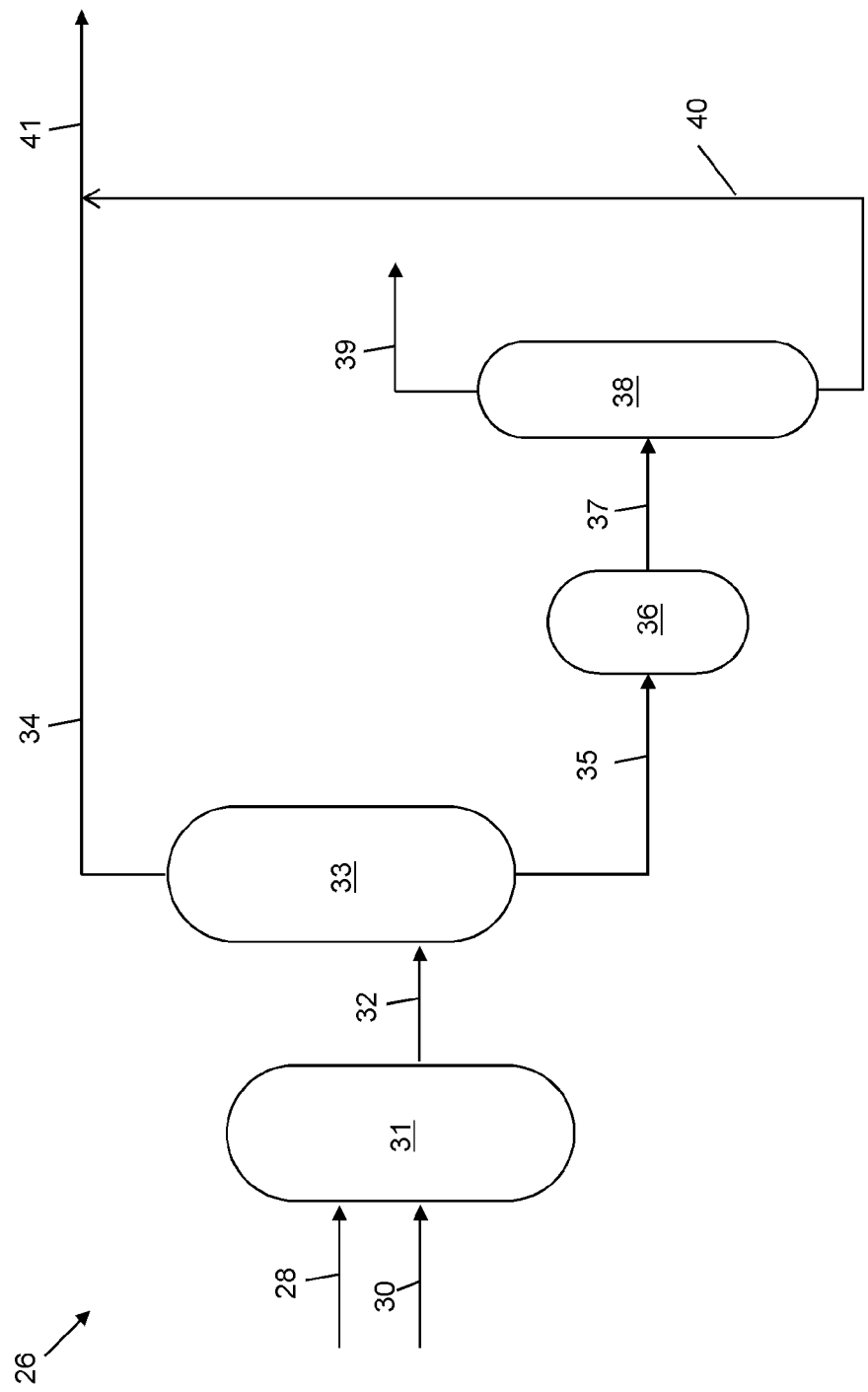
FIG. 2 is a schematic diagram of an integrated desulfurization system and process.

Referring now to FIG. 2, an integrated desulfurization system 26 is schematically illustrated. System 26 includes a hydrodesulfurization reaction zone 31, a flashing column 33, a gas phase catalytic oxidative desulfurization reaction zone 36 and a separation zone 38. A hydrocarbon stream 30 is introduced to the hydrodesulfurization reaction zone 31 and into contact with a hydrodesulfurization catalyst and a hydrogen feed stream 28 at mild operating conditions.

The resulting hydrodesulfurized hydrocarbon stream 32 is substantially free of labile organosulfur compounds including aliphatic sulfur-containing compounds and thiophenes, benzothiophenes and their derivatives. Stream 32 is then passed to a flashing column 33 to be fractionated at a target cut point temperature range of about 300° C. to about 360° C., and in certain embodiments about 340° C., into two streams 34 and 35. Stream 34 boiling below the target cut point temperature, has an ultra-low level of organosulfur compounds. Stream 34 can be recovered separately or in combination with the portion boiling at or above the target cut point temperature that has been subjected to gas phase catalytic oxidative desulfurization reaction in zone 36. Stream 35, which boils above the target cut point temperature, is passed to the gas phase catalytic oxidative desulfurization reaction zone 36 to be contacted with a gaseous oxidizing agent and one or more catalytically active metals. The gaseous oxidizing agent can be an oxidant such as oxides of nitrogen, oxygen, or air, or combinations comprising any of these oxidants. The higher boiling point fraction, the gaseous oxidizing agent and the oxidation catalyst are maintained in contact for a period of time that is sufficient to complete the C—S bonds breaking reactions. In the gas phase catalytic oxidative desulfurization zone 36, at least a substantial portion of the aromatic sulfur-containing compounds and their derivatives boiling at or above the target cut point are converted to $SO_x$.

Stream 37 from the gas phase catalytic oxidative desulfurization zone 36 is passed to the separation zone 38 to remove the $SO_x$ as discharge gas stream 39 and obtain a hydrocarbon stream 40 that contains an ultra-low level of sulfur, i.e., less than 15 ppmw.

Streams 34 and 40 can be combined to provide a hydrocarbon product 41 that contains an ultra-low level of sulfur. In alternative embodiments, the products can be separately recovered.

In general, the oxidation catalyst can be selected from one or more homogeneous or heterogeneous catalysts having metals from Group IB, IIB, IIIB and IIIA of the Periodic Table, including those selected from the group consisting of Cu, Ce, Zn and Al.

The gas phase catalytic compositions described herein are made by preparing an aqueous solution of the nitrates of Cu, Zn, and Al, and optionally Ce, and then combining this solution with an aqueous alkaline solution which contains NaOH, and/or one or more of $(NH_4)_2CO_3$, $Na_2CO_3$ and $NH_4CO_3$.

These solutions are combined at a temperature which may range from about 50° C. to about 65° C., and at a pH in the range of from about 6.5 to about 14. The resulting hydroxides, carbonates, and/or hydroxycarbonates precipitate are filtered, washed, and dried for at least ten hours at a temperature of at least 100° C. The resulting dried material is then calcined for about 2-4 hours at a temperature of at least 450° C. to form compositions described in Examples 2-12. The precipitate may be aged prior to the filtering and washing, as elaborated in the examples.

The catalytic compositions comprise oxides of Cu, Zn, and Al in defined weight percent ranges, and optionally Ce. The weight percentages are in the range of from 5 to 20 weight percent ZnO, from 10 to 50 weight percent CuO, and from 20 to 70 weight percent of $Al_2O_3$. When $Ce_2O_3$ is present, its amount is in the range of from 0.1 to 10 weight percent of the composition. The compositions exhibit X-ray amorphous phase with highly dispersed oxides of Zn, Cu, and optionally Ce.

The aforementioned structure has the chemical formula $Cu_xZn_{1-x}Al_2O_4$, which is in accordance with the standard formula for spinels, i.e., "$MAl_2O_4$," where "M" signifies a metal or combination of metals. Within the spinel, the ZnO and CuO are present as highly dispersed crystals. If $Ce_2O_3$ is present, it is in particle form, with particles ranging in diameter from 5 nm to 10 nm. In certain embodiments, x is in the range of from 0.1 to 0.6, and in further embodiments from 0.2 to 0.5.

The compositions described herein preferably are granular in nature, and may be formed into various shapes such as cylinder, sphere, trilobe, or having a quadrilobate shape. The granules of the compositions preferably have diameters ranging from 1 mm to 4 mm.

The compositions have specific surface areas in the range of from 10 $m^2/g$ to 100 $m^2/g$, in certain embodiments from 50 $m^2/g$ to 100 $m^2/g$, with pores ranging from 8 nm to 12 nm, in certain embodiments from 8 nm to 10 nm. The weight percentages are in the range of from 20-45 for CuO, from 10-20 for ZnO, and from 20-70 for $Al_2O_3$, in certain embodiments from 30-45 for CuO, from 12-20 for ZnO, and from 20-40 for $Al_2O_3$.

The catalytic compositions are used in reactors such as fixed beds, ebullated beds, moving beds or fluidized beds.

It is frequently desirable to form composites of the catalytic composition, and this is preferably done by adding a binder to the compositions prior to calcination. The binder may be, e.g., polyethylene oxide, polyvinyl alcohol, aluminum pseudoboehmite, silica gel, or mixtures thereof. The binder may be added in amounts ranging from about 1 wt % to about 20 wt % of the precipitate. The resulting mixture may be extruded through, e.g., a forming dye, and then dried, preferably at room temperature for 24 hours, followed by drying at about 100° C. for 2-4 hours. The extrusion product is then heated slowly, e.g., by increasing temperatures by 2-5° C. every minute until a temperature of 500° C. is reached, followed by calcinations at 500° C. for 2-4 hours.

In certain embodiments the feedstock, i.e., the sulfur containing hydrocarbon, will vary, but preferably is one with a boiling point above 36° C., and in certain embodiments above 565° C. In further embodiments the hydrocarbon feedstream is a straight run gas oil boiling in the range of about 180° C. to about 450° C., typically containing up to about 2 weight % sulfur, although one of ordinary skill in the art will appreciate that other hydrocarbon streams can benefit from the practice of the system and method of the present invention.

The operating conditions for the gas phase catalytic oxidative desulfurization zone 36 include: a weight hourly space velocity (WHSV) in the range of from 1 $h^{-1}$ to 20 $h^{-1}$, in certain embodiments 5 $h^{-1}$ to 15 $h^{-1}$, and in further embodiments 8 $h^{-1}$ to 10 $h^{-1}$; a gas hourly space velocity (GHSV) in the range of from 1,000 $h^{-1}$ to 20,000 $h^{-1}$ in certain embodiments 5,000 $h^{-1}$ to 15,000 $h^{-1}$ and in further embodiments 5,000 $h^{-1}$ to 10,000 $h^{-1}$; an operating pressure in the range of from about 1 bar to about 30 bars, in certain embodiments about 1 bar to about 10 bars, and in further embodiments about 1 bar to about 5 bars; and an operating temperature in the range of from about 200° C. to about 600° C., in certain embodiments about 250° C. to about 550° C., and in further embodiments about 300° C. to about 500° C. The molar ratio of $O_2$:C is generally about 1:100 to about 1:10, in certain embodiments about 1:50 to about 1:10, and in further embodiments about 1:20 to about 1:10. The molar ratio of $O_2$:S is generally about 1:1 to about 150:1, in certain embodiments about 10:1 to about 100:1, and in further embodiments about 20:1 to about 50:1.

The hydrodesulfurization reaction zone is operated under mild conditions. As will be understood by one of ordinary skill in the art, "mild" operating conditions are relative and the range of operating conditions depends on the feedstock being processed. According to the system described herein, these mild operating conditions as used in conjunction with hydrotreating a mid-distillate stream, i.e., boiling in the range of from about 180° C. to about 370° C., include: a temperature in the range of from about 300° C. to about 400° C., in certain embodiments from about 320° C. to about 380° C.; a reaction pressure in the range of from about 20 bars to about 100 bars, in certain embodiments from about 30 bars to about 60 bars; a hydrogen partial pressure of below about 55 bars, in certain embodiments from about 25 bars to about 40 bars; a feed rate in the range of from about 0.5 $hr^{-1}$ to about 10 $hr^{-1}$, in certain embodiments from about 1.0 $hr^{-1}$ to about 4 $hr^{-1}$; and a hydrogen feed rate in the range of from about 100 liters of hydrogen per liter of oil (L/L) to about 1000 L/L, in certain embodiments from about 200 L/L to about 300 L/L.

The hydrodesulfurization catalyst can be, for instance, an alumina base containing cobalt and molybdenum or nickel and molybdenum.

While not wishing to be bound by theory, the apparatus and process for reduction of sulfur levels of hydrocarbon streams described herein includes integration of mild hydrodesulfurization with a gas phase catalytic oxidation reaction zone, in which the refractory organosulfur compounds are desulfurized by breaking the C—S bonds as shown in FIG. 3A and/or FIG. 3B. The sulfur in the hydrocarbon molecules are converted into $SO_x$ and purged from the system in the gas phase through flashing.

The present process and system offers distinct advantages when compared to conventional processes for deep desulfurization of hydrocarbon fuel. The addition of a flash column into an the apparatus and process of the invention that integrates a hydrodesulfurization zone and a gas phase catalytic oxidative desulfurization zone uses low cost units in both zones as well as more favorable conditions in the hydrodesulfurization zone, i.e., milder pressure and temperature and reduced hydrogen consumption. Only the fraction boiling at or above the target cut point temperature is oxidized in gas phase to convert the refractory sulfur-containing compounds to $SO_x$. Traditional methods first oxidize the organosulfur compounds to sulfoxides and sulfones and then remove them from the hydrocarbon mixture. The present invention selectively breaks the C—S bonds in the organosulfur compounds to produce low-sulfur hydrocarbons and $SO_x$. This results in more cost-effective desulfurization of hydrocarbon fuels, particularly removal of the refractory sulfur-containing compounds, thereby efficiently and economically achieving ultra-low sulfur content fuel products. Furthermore, the high operating costs and undesired side reactions that can negatively impact certain desired fuel characteristics are avoided using the process and apparatus of the present invention.

EXAMPLES

Example 1

A gas oil fraction, the properties of which are given in Table 4, was subjected to hydrodesulfurization in a hydrotreating vessel using an alumina base containing cobalt and molybdenum as hydrotreating catalyst. The hydrotreating vessel was operated at 42 Kg/cm² hydrogen partial pressure at the reactor outlet, weighted average bed temperature of 332° C., liquid hourly space velocity of 3.2 h⁻¹ and hydrogen to oil ratio of 300 liters/liters. The sulfur content of the gas oil was reduced to 1,100 ppmw from 11,500 ppmw.

TABLE 4

| Property | Unit | Value |
|---|---|---|
| API Gravity | ° | 35.2 |
| Carbon | W % | 85.83 |
| Hydrogen | W % | 12.85 |
| Sulfur | W % | 1.15 |
| Nitrogen | ppmw | 100 |
| ASTM D86 Distillation | | |
| IBP/5 V % | ° C. | 149/207 |
| 10/30 V % | ° C. | 234/269 |
| 50/70 V % | ° C. | 293/325 |
| 85/90 V % | ° C. | 361/379 |

The hydrotreated feedstock was fractionated in an atmospheric distillation column to split the gas oil into two fractions: a Light Gas Oil fraction (LGO) that boils at 340° C. and less and a Heavy Gas Oil fraction (HGO) that boils at 340° C. and higher. The sulfur content of the LGO fraction was less than 10 ppmw.

The hydrotreated HGO fraction that boils at 340° C. and higher, containing 1100 ppmw of sulfur was subjected to gas phase oxidative desulfurization using a gaseous oxidizing catalyst at 450° C., 1 atmosphere pressure, WHSV of 6 h⁻¹ and GHSV of 2084 h⁻¹ over a Cu—Zn—Al catalyst. The sulfur content of the oil layer was reduced to 209 ppmw from 1100 ppmw. The hydrodesulfurized LGO stream and gaseous oxidized HGO stream were combined to obtain a diesel product with 24 ppmw sulfur.

Examples 2-13

Examples 2-13 are provided which describe methods to make the gaseous oxidative desulfurization catalyst material (2-12) and tests using those catalysts (13).

Example 2 g of Cu(NO₃)₂ (0.2 moles), 13.3 g of Zn(NO₃)₂ (0.07 moles) and 50.1 g of Al(NO₃)₃ (0.235 moles) were dissolved in 500 ml of distilled water, to form what shall be referred to as "solution A" hereafter. The pH of the solution was 2.3.

Similarly, 19.08 g of Na₂CO₃ (0.18 moles) and 36 g of NaOH (0.9 moles) were dissolved in 600 ml of distilled water, to produce "solution B," which had a pH of 13.7.

Solution A was heated to 65° C. and solution B was added to solution A at a rate of about 5 ml/minute with constant agitation, until all of solution B was added. The resulting mixture had a pH of 11.0. A precipitate formed which was aged for 6 hours at 65° C. The solution was cooled to room temperature and filtered with a Buchner funnel. Precipitate was washed with distilled water. Analysis of the precipitate showed that nearly all (about 99%) of the Cu, Zn and Al precipitated out of the solution.

The precipitate was then dried at 110° C. for 12 hours. The dried material was dark brown in color. Following drying, it was calcined at 500° C. for 2 hours.

The calcined product contained 36 wt % elemental Cu, 12.1 wt % elemental Zn, 14.2 wt % elemental Al and 0.02 wt % elemental Na. (In all of the examples which follow, weight percent is given in terms of the pure element, rather than the oxide.) In order to determine the weight percent of the oxide in the composition, one divides the amount of element by its molecular weight, multiplies by the molecular weight of the oxide, and then normalizes to 100%. As an example, for the composition described herein, the wt % of Cu (36) is divided by the molecular weight of Cu, which is 63.54 to yield 0.567. This is multiplied by the molecular weight of CuO, which is 79.54 to yield 45.07. When similar operations are performed on the Zn and Al amounts, values of 15.56 and 53.66, respectively, are obtained, which normalize to 39.43 wt % CuO, 13.61% ZnO, and 46.95 wt % Al₂O₃.

The atomic ratio of Cu:Zn:Al was 3:1:2.8. The product had a specific surface area of 94 m²/g, a pore volume of 0.24 cm³/g, and an average pore diameter of 9.5 nm. It exhibited highly dispersed CuO and ZnO, with an X-ray amorphous phase. "X-ray amorphous oxide phase" as used herein means that, when observed via high resolution transmission electron microscopy ("HRTEM"), crystalline particles ranging from 2-10 nm, and usually 2-5 nm, were observed. Lattice parameters were very close to those of spinels and its chemical composition found from EDX corresponded to the formula $Cu_{0.3}Zn_{0.7}Al_2O_4$.

Example 3

A 500 ml sample of solution A was prepared according to the procedure in Example 2.

96.1 g of (NH₄)₂CO₃ (1 mole) was dissolved in 600 ml of distilled water to produce "solution C," which has a pH of 8.7.

Solution A was heated to 65° C., and solution C was added gradually to solution A, with constant agitation. The combined solution had a pH of 7.6.

Following combination of solutions A and C, a precipitate formed, which was aged for 1 hour at 65° C. The precipitate was filtered in the same way the precipitate of Example 2 was filtered, and was then washed with room temperature distilled water. Analysis showed that about 99% of Zn and Al from the solution and 80-85% of Cu passed to the precipitate.

Precipitate was dried, as in Example 2, and then calcined at 500° C. for 4 hours.

The resulting compound contained 26.3 wt % elemental Cu, 15.8 wt % elemental Zn, 22.3 wt % elemental Al, and the atomic ratio of Cu:Zn:Al was 1.7:1:3.5. The compound had a specific surface area of 82 m²/g, a pore volume of 0.29 cm³/g, and an average pore diameter of 12 nm. It exhibited an X-ray amorphous oxide phase ($Cu_{0.45}Zn_{0.55}Al_2O_4$), and highly dispersed CuO, which contained less than 50% of the total copper.

Example 4

A 500 ml sample of solution A was prepared according to the procedure in Example 2.

47.7 g (0.45 moles) of Na₂CO₃ and 18 g (0.45 moles) of NaOH were dissolved in 600 ml of distilled water, to produce solution B with a pH of 13.4.

Solution A was heated to 50° C., and solution B was added gradually, at a rate of 4 ml/min, with constant agitation. The resulting solution had a pH was 10.0.

A precipitate formed and was aged for 2 hours at 50° C. The precipitate was filtered and washed with room temperature distilled water. Following washing, the precipitate was analyzed and found to contain about 99% of the Cu, Zn and Al of the amount initially contained in the solution, and a high amount of Na.

Following drying at room temperature for 12 hours, and then for 12 hours at 110° C., the dark brown precipitate was calcined at 500° C. for 2 hours.

The resulting product contained 40.5 wt % elemental Cu, 13.3 wt % elemental Zn, 13.8 wt % elemental Al, and 0.47 wt % elemental Na. The atomic ratio of the components Cu:Zn:Al was 3.1:1:2.5. The composition had a specific surface area of 62 m$^2$/g, a pore volume of 0.15 cm$^3$/g, and an average pore diameter of 8.7 nm. As with the preceding examples, the composition exhibited an X-ray amorphous oxide phase ($Cu_{0.2}Zn_{0.8}Al_2O_4$), and a highly dispersed crystal phase which contained most of the Cu.

Example 5

The steps of Example 2 were followed, but the precipitate was filtered hot, and without aging. The calcined composition contained 40.2 wt % elemental Cu, 9.7 wt % elemental Zn, 17.2 wt % elemental Al, and 0.22 wt % elemental Na. The atomic ratio of Cu:Zn:Al was 4.2:1:4.3. The specific surface area was 75 m$^2$/g, and the pore volume was 0.29 cm$^3$/g. Average pore diameter was 12.5 nm. The phase composition was highly dispersed, crystalline phases of CuO, ZnO, and $Al_2O_3$.

Example 6

In this example, Example 3 was followed except 0.18 g of $Ce(NO_3)_3$ ($5.5 \times 10^{-4}$ moles) was also added in the preparation of solution A. After the precipitate was formed, it was aged for 6 hours at 55° C. Analysis of the calcined composition showed 20.9 wt % elemental Cu, 17.1 wt % elemental Zn, 23.9 wt % elemental Al and 0.5 wt % elemental Ce. The atomic ratio of Cu:Zn:Ce:Al was 3.0:1:0.01:3.8. The composition had a specific surface area of 83 m$^2$/g, a pore volume of 0.20 cm$^3$/g, and an average pore diameter of 10.0 nm. It exhibited an X-ray amorphous oxide phase with a composition of $Cu_{0.5}Zn_{0.5}Al_2O_4$ and a highly dispersed crystalline phase of CuO, which contained less than 60% of the Cu, and also a Ce phase, with particles not exceeding 5 nm in diameter.

Example 7

This example parallels Example 6, except the amount of $Ce(NO_3)_3$ was increased to 3.1 g ($9.5 \times 10^{-3}$ moles). Precipitation formation and filtration were carried out at 65° C. for 6 hours.

The resulting calcined composition contained 20.2 wt % elemental Cu, 15.1 wt % elemental Zn, 20.2 wt % elemental Al and 8.5 wt % elemental Ce. Atomic ratios of Cu:Zn:Ce:Al were 1:35:1:0.25:3.2. The specific surface area was 125 m$^2$/g, with a pore volume of 0.3 cm$^3$/g. Average pore diameter was 8.0 nm. As with the other compositions, it exhibited an X-ray amorphous oxide phase and a formula of $Cu_{0.5}Zn_{0.5}Al_2O_4$. It also exhibited a Ce phase with particles not greater than 10 nm in diameter.

Example 8

In this example, "solution A" contained 9.4 g of $Cu(NO_3)_2$ (0.05 moles), 13.3 g of $Zn(NO_3)_2$ (0.07 moles) and 27.7 g of $Al(NO_3)_2$ (0.13 moles) in 500 ml of distilled water. Solution A had a pH of 2.6. Solution B contained 53.0 g of $Na_2CO_3$ (0.5 moles) and 18 g of NaOH (0.45 moles) in 600 ml of water. Solution B had a pH of 13.7.

The solutions were mixed and the resulting precipitate was separated, as in Example 2. The calcined composition contained 10 wt % elemental Cu, 20.0 wt % elemental Zn, 21.3 wt % elemental Al and 0.65 wt % elemental Na. The atomic ratio of Cu:Zn:Al was 0.5:1:2.5, with a specific surface area of 112 m$^2$/g, a pore volume of 0.30 cm$^3$/g, and average pore diameter of 10.8 nm. The composition exhibited an X-ray amorphous oxide phase formula $Cu_{0.33}Zn_{0.67}Al_2O_4$, and contained a highly dispersed crystalline ZnO phase.

Example 9

In this example, solutions A and C were prepared in the same manner as the solutions in Example 3.

Aging of the precipitate took place over 6 hours at 65° C. and pH 6.5, rather than 1 hour as in Example 3.

The resulting calcined product contained 10.0 wt % elemental Cu, 12.1 wt % elemental Zn, 33.8 wt % elemental Al and 0.05 wt % elemental Na. The atomic ratio for Cu:Zn:Al was 0.84:1:6.7. The specific surface area was 100 m$^2$/g, the pore volume was 0.35 cm$^3$/g, and the average pore diameter was 11.0 nm. The composition exhibited the same X-ray amorphous oxide phase formula $Cu_{0.4}Zn_{0.6}Al_2O_4$, and there was a $\gamma$-$Al_2O_3$ phase as well.

Example 10

In this example, Solution A contained 9.4 g of $Cu(NO_3)_2$ (0.05 moles), 3.8 g of $Zn(NO_3)_2$ (0.02 moles), and 95.8 g of $Al(NO_3)_2$ (0.45 moles) dissolved in 500 ml distilled water. Solution A had a pH of 2.25.

Solution C contained 53.0 g of $(NH_4)_2CO_3$ (0.55 moles) dissolved in 600 ml of distilled water. The pH of solution C was 8.0.

Precipitation, and separation of the precipitate, took place over 4 hours at 65° C. and pH 6.5, to yield a composition containing 13.0 wt % elemental Cu, 4.2 wt % elemental Zn and 36.5 wt % elemental Al. The atomic ratio for Cu:Zn:Al was 3.1:1:21. The specific surface area was 150 m$^2$/g, with a pore volume of 0.45 cm$^3$/g, and an average pore diameter of 9.5 nm. The observed formula of the composition was $ZnAl_2O_4$ and $Al_2O_3$ modified by Cu in the form of CuO.

Example 11

In this example, solution A contained 46.9 g of $Cu(NO_3)_2$ (0.25 moles), 13.3 g of $Zn(NO_3)_2$ (0.07 moles), and 42.6 g of $Al(NO_3)_2$ (0.20 moles) dissolved in 500 ml of distilled water. Solution A had a pH of 2.3. Solution B contained 53.0 g of $Na_2CO_3$ (0.5 moles) and 12 g of NaOH (0.3 moles) in 600 ml distilled water. Solution B had a pH of 13.3.

Precipitation conditions were same as those of Example 2, which did not permit total precipitation of Al. In fact, while the precipitation of Cu and Zn was 99% that of Al did not exceed 80%. The resulting composition contained 50 wt % elemental Cu, 25.2 wt % elemental Zn, 7.4 wt % elemental Al and 0.85 wt % elemental Na. The atomic ratio of Cu:Zn:Al was 2.0:1.0:0.7. The specific surface area was 50 m$^2$/g, the pore volume was 0.20 cm$^3$/g, and the average pore diameter was 15.2 nm. The formula of the composition was $Cu_{0.33}Zn_{0.67}Al_2O_4$, with highly dispersed crystalline CuO and ZnO phases.

Example 12

In this example, solution A did not contain $Al(NO_3)_2$, but only 7.5 g of $Cu(NO_3)_2$ (0.04 moles), 3.8 g of $Zn(NO_3)_2$ (0.02 moles) and 45.7 g of Ce(NO$_3$)$_3$ (0.14 moles) dissolved in 500 ml of distilled water. Solution A had a pH of 4.2.

Solution D contained 15.0 g of (NH$_4$)$_2$CO$_3$ (0.16 moles) and 18.0 g of NH$_4$HCO$_3$ (0.23 moles) in 600 ml distilled water. Solution D has a pH of 8.0.

Following calcination, the composition contained 6.5 wt % elemental Cu, 3.85 wt % elemental Zn and 78 wt % elemental Ce. The atomic ratio of components Cu:Zn:Ce was 1.7:1:9.5, and the specific surface area was 85 m$^2$/g, with pore volume of 0.23 cm$^3$/g and average pore diameter of 10.9 nm. The observed composition by XRD was a highly dispersed crystalline CeO$_2$ phase. Crystalline phases of Cu and Zn were not detected.

Example 13

The catalysts prepared in Examples 2-12 were tested for their ability to oxidatively desulfurize fuel oil containing sulfur-containing compounds. Fuels were prepared which contained thiophene, DBT (dibenzothiophene), and 4,6 DMDBT. The fuels were heated to gaseous state, and passed over the catalytic compounds. In the Tables which follow, the formulation of the catalyst ("Cu—Zn—Al," "Cu—Zn—Al—Ce," or "Cu—Zn—Ce") is followed by "(1)" or "(2)". This refers to the nature of solutions B, C and D in Examples 2-12, with "(1)" referring to a Na containing solution (as in solution B) and "(2)" to an ammonium containing solution (as in solutions C and D). The final number indicates which example was used to produce the catalyst.

The diesel fuel containing thiophene and DBT had the following properties: T$_{50}$ of 264, T$_{95}$ of 351, density of 0.841 Kg/1 at 20° C., and 1.93 wt % of sulfur. Thiophene was oxidized with the catalyst prepared by the method in Example 2. Similarly, 4,6 DMDBT was oxidized with the catalysts prepared by the methods in Examples 2, 3, and 6. Tables 5, 6, and 7 present these results.

TABLE 5

Oxidation of thiophene in octane solution

| Catalyst | T °C. | S Content ppmw | O$_2$/S | GHSV h$^{-1}$ | WHSV h$^{-1}$ | S Removal W % | HC Conversion W % |
|---|---|---|---|---|---|---|---|
| Cu-Zn-Al (1)-2 | 329 | 1000 | 59 | 22500 | 28 | 90 | 1.2 |

TABLE 6

Oxidation of DBT in toluene solution

| Catalyst | T °C. | S Content ppmw | O$_2$/S | GHSV h$^{-1}$ | WHSV h$^{-1}$ | S removal W % | HC Conversion W % |
|---|---|---|---|---|---|---|---|
| Cu-Zn-Al (1)-2 | 300 | 800 | 80 | 2600 | 6 | 87 | 2.1 |
| Cu-Zn-Al (2)-3 | 360 | 900 | 139 | 2900 | 6 | 53 | 3.5 |
| Cu-Zn-Al (1)-4 | 385 | 900 | 120 | 3700 | 8 | 69 | 3.9 |
| Cu-Zn-Al (1)-5 | 370 | 900 | 95 | 3200 | 8 | 31 | 2.9 |
| Cu-Zn-Al-Ce(2)-6 | 350 | 900 | 140 | 2900 | 6 | 55 | 3.1 |
| Cu-Zn-Al-Ce(2)-7 | 400 | 900 | 140 | 3100 | 6 | 26 | 3.0 |
| Cu-Zn-Al (1)-8 | 350 | 1100 | 100 | 1700 | 6 | 33 | 1.3 |
| Cu-Zn-Al (1)-9 | 340 | 1000 | 120 | 3900 | 6 | 48 | 3.7 |
| Cu-Zn-Al (1)-10 | 400 | 1500 | 40 | 27000 | 28 | 66 | 1.7 |
| Cu-Zn-Al (1)-11 | 340 | 1100 | 60 | 1500 | 6 | 24 | 3.3 |
| Cu-Zn-Ce (2)-12 | 310 | 800 | 70 | 2600 | 6 | 22 | 1.9 |
| Cu-Zn-Ce (2)-12 | 330 | 4100 | 30 | 4100 | 6 | 14 | 4.2 |

TABLE 7

Oxidation of 4,6-DMDBT in toluene solution

| Catalyst | T °C. | S Content ppmw | O$_2$/S | GHSV h$^{-1}$ | WHSV h$^{-1}$ | S Removal W % | HC Conversion W % |
|---|---|---|---|---|---|---|---|
| Cu-Zn-Al (1)-2 | 312 | 900 | 140 | 2085 | 6 | 81 | 3.8 |
| Cu-Zn-Al (2)-3 | 350 | 1000 | 140 | 2100 | 6 | 78 | 3.5 |
| Cu-Zn-Al-Ce(2)-6 | 350 | 1000 | 140 | 2100 | 6 | 37 | 4.1 |

About 0.16 vol. % of H$_2$S, 0.118 vol. % of SO$_2$, and 5 vol. % of CO$_2$ were found at the reactor outlet upon oxidation of the diesel fuel.

In these tables, "GHSV" refers to the gas volume rate (in liters/hour per liter of catalyst), "WHSV" means weight hourly space velocity: feed rate (Kg/hours) over the weight of the catalyst. "O$_2$/S" refers to the rate at which oxygen was introduced to the material being tested. "S" and "HC" refer to "sulfur" and "hydrocarbon," respectively.

The foregoing examples describe features of the invention which include a catalytic composition useful, e.g., in oxidative removal of sulfur from gaseous, sulfur containing hydrocarbons, as well as processes for making the compositions, and their use.

As noted, supra, the compositions contain defined amounts of the metallic oxides. The weight percentages permitted by the invention are 5 to less than 20 weight percent zinc oxide, from 10 to 50 weight percent copper oxide, and from 20 to 70 weight percent of aluminum oxide. When cerium oxide is present, its amount can range from 0.1 to 10 wt percent of the composition.

The aforementioned structure has a lattice parameter corresponding to spinel according to HRTEM data and the chemical formula Cu—Zn$_{1-x}$Al$_2$O$_4$ found from EDX analysis. The standard formula for spinels is MAl$_2$O$_4$, where "M" signifies a metal or combination of metals. Within the spinel, the ZnO and CuO are present as highly dispersed crystals. If Ce$_2$O$_3$ is present, it is in particle form, with particles ranging in diameter from 5 nm to 10 nm. In certain embodiments x ranges from 0.1 to 0.6, and in further embodiments from 0.2 to 0.5.

The method and system of the present invention have been described above and in the attached drawings; however, modifications will be apparent to those of ordinary skill in the art and the scope of protection for the invention is to be defined by the claims that follow.

The invention claimed is:

1. A method of processing a hydrocarbon feed to remove undesired organosulfur compounds comprising:
   a. subjecting the hydrocarbon feed to a hydrodesulfurizing process to produce a hydrotreated effluent;
   b. flashing the hydrotreated effluent to provide a low boiling temperature fraction that contains a reduced level of organosulfur compounds and a high boiling temperature fraction having refractory organosulfur compounds;
   c. separating the high and low boiling temperature fractions; and
   d. contacting the high boiling temperature fraction with a gaseous oxidizing agent and an oxidizing catalyst having a formula $Cu_xZn_{1-x}Al_2O_4$ wherein x ranges from 0 to 1 to convert refractoryorganosulfur compounds including dibenzothiophenes, alkyl derivatives of dibenzothiophenes and long-chain alkylated derivatives of benzothiophene having a boiling point in the range of the high boiling temperature fraction, to $SO_x$ by breaking the C—S bonds.

2. The method of claim 1, wherein the oxidizing catalyst comprises copper oxide in an amount ranging from 10 weight percent (wt %) to 50 wt %, zinc oxide in an amount ranging from 5 wt % to less than 20 wt %, and aluminum oxide in an amount ranging from 20 wt % to 70 wt %, wherein said catalytic composition has an X-ray amorphous oxide phase, and highly dispersed crystalline ZnO and CuO.

3. The method of claim 1, wherein the temperature cut point in step (b) is about 340° C.

4. The method of claim 1, wherein the low boiling temperature fraction includes aliphatic organosulfur compounds.

5. The method of claim 4, wherein the aliphatic organosulfur compounds include sulfides, disulfides, and mercaptans.

6. The method of claim 4, wherein the low boiling temperature fraction further includes thiophene and alkyl derivatives of thiophene.

7. The method of claim 1, wherein the high boiling temperature fraction includes dibenzothiophene, alkyl derivatives of dibenzothiophene and long-chain alkylated derivatives of benzothiophene having a boiling point in the range of the high boiling temperature fraction.

8. The method of claim 1, wherein the hydrocarbon feed is a straight run gas oil boiling in the range of about 180° C. to about 450° C.

9. The method of claim 8, wherein the hydrodesulfurizing process is operated at mild operating conditions.

10. The method of claim 9, wherein the hydrogen partial pressure is less than about 55 bars.

11. The method of claim 9, wherein the hydrogen partial pressure is about 25 bars to about 40 bars.

12. The method of claim 9, wherein the operating temperature is about 300° C. to about 400° C.

13. The method of claim 9, wherein the operating temperature is about 320° C. to about 380° C.

14. The method of claim 9, wherein the hydrogen feed rate in the hydrodesulfurizing process step is from about 100 liters of hydrogen per liter of oil to about 1000 liters of hydrogen per liter of oil.

15. The method of claim 9, wherein the hydrogen feed rate in the hydrodesulfurizing process step is from about 200 liters of hydrogen per liter of oil to about 300 liters of hydrogen per liter of oil.

16. The method of claim 8, wherein step (d) occurs substantially in gas phase.

17. The method of claim 1, wherein the oxidizing agent is selected from the group consisting of oxides of nitrogen, oxygen, and air.

18. The method of claim 1, further comprising recovering the hydrotreated effluent from step (a).

19. The method of claim 1 wherein the catalytic composition used in step (d) further comprises —$Ce_2O_3$ in the form of particles ranging in diameter from 5 nm to 10 nm, in an amount ranging from 0.1 wt % to 10 wt % of said catalytic composition.

20. The method of claim 1 wherein the catalytic composition used in step (d) is in granular form.

21. The method of claim 1 wherein the catalytic composition used in step (d) is formed as a cylinder, a sphere, a trilobe, or having a quadrilobate shape.

22. The method of claim 21 wherein particles of the catalytic composition have effective diameter of from 1 mm to 4 mm.

23. The method of claim 21 wherein particles of the catalytic composition have having a specific surface area of from 10 $m^2$/g to 100 $m^2$/g.

24. The method of claim 21 wherein particles of the catalytic composition have having a specific surface area of from 50 $m^2$/g to 100 $m^2$/g.

25. The method of claim 21 wherein particles of the catalytic composition have pores with effective diameters of from 8 nm to 12 nm.

26. The method of claim 21 wherein particles of the catalytic composition have pores with effective diameters of from 8 nm to 10 nm.

27. The method of claim 21 wherein particles of the catalytic composition have pores with a volume of from about 0.1 $cm^3$/g to about 0.5 $cm^3$/g.

28. The method of claim 1 wherein the catalytic composition used in step (d) comprises from 20 wt % to 45 wt % CuO, from 10 wt % to less than 20 wt % ZnO, and from 20 wt % to 70 wt % of $Al_2O_3$.

29. The method of claim 1 wherein the catalytic composition used in step (d) comprises from 30 wt % to 45 wt % CuO, from 12 wt % to less than 20 wt % ZnO, and from 20 wt % to 40 wt % $Al_2O_3$.

30. The method of claim 1 wherein x in the catalytic composition used in step (d) is from 0.1 to 0.6.

31. The method of claim 1 wherein x in the catalytic composition used in step (d) is from 0.2 to 0.5.

32. The method of claim 1, further comprising
   e. removing the by-product $SO_x$ in a separation zone from the sulfur-free hydrocarbons; and
   f. recovering an ultra-low sulfur level hydrocarbon product.

33. The method of claim 32, further comprising combining effluents from steps (a) and (f).

* * * * *

UNITED STATES PATENT AND TRADEMARK OFFICE
CERTIFICATE OF CORRECTION

| | | |
|---|---|---|
| PATENT NO. | : 8,906,227 B2 | Page 1 of 1 |
| APPLICATION NO. | : 13/741819 | |
| DATED | : December 9, 2014 | |
| INVENTOR(S) | : Bourane et al. | |

It is certified that error appears in the above-identified patent and that said Letters Patent is hereby corrected as shown below:

Title page, Assignee item (73) should appear as follows:

Saudi Arabian Oil Company

Signed and Sealed this
Third Day of March, 2015

Michelle K. Lee
*Deputy Director of the United States Patent and Trademark Office*

UNITED STATES PATENT AND TRADEMARK OFFICE
CERTIFICATE OF CORRECTION

PATENT NO. : 8,906,227 B2  
APPLICATION NO. : 13/741819  
DATED : December 9, 2014  
INVENTOR(S) : Abdennour Bourane et al.

It is certified that error appears in the above-identified patent and that said Letters Patent is hereby corrected as shown below:

In the Claims

Column 20, after line 57, please add the following claims:

34. The method of claim 19, wherein the $Ce_2O_3$ is in the form of particles ranging in diameter from 5 nm to 10 nm, in an amount ranging from 0.1 wt% to 10 wt% of said catalytic compositions.

35. An apparatus for processing a hydrocarbon feed containing undesired organosulfur compounds comprising:
    a hydrodesulfurization zone having an inlet in fluid communication with the hydrocarbon feed and an outlet for discharging hydrotreated effluent;
    a flashing column operable to flash the hydrotreated effluent at a temperature cut point of about 320°C to about 360°C, the flashing column including;
        an inlet for receiving the hydrotreated effluent,
        a low boiling temperature outlet for discharging a low boiling temperature fraction, and
        a high boiling temperature outlet for discharging a high boiling temperature fraction containing refractory organosulfur compounds;
    a gas phase catalytic oxidative desulfurization zone containing an oxidizing catalyst having a formula $Cu_xZn_{1-x}Al_2O_4$ wherein x ranges from 0 to 1 and a gaseous oxidizing agent, the gas phase catalytic oxidative desulfurization zone having an inlet in fluid communication with the high boiling temperature outlet and an outlet for discharging low-sulfur hydrocarbons and $SO_x$.

36. The apparatus of claim 35, wherein the gas phase catalytic oxidative desulfurization zone operates substantially in gas phase.

Signed and Sealed this  
Twenty-third Day of June, 2015

Michelle K. Lee  
*Director of the United States Patent and Trademark Office*